(12) United States Patent
Kim

(10) Patent No.: US 11,206,631 B2
(45) Date of Patent: Dec. 21, 2021

(54) APPARATUS AND METHOD FOR PERFORMING POSITIONING IN NEW RADIO

(71) Applicant: KT CORPORATION, Gyeonggi-do (KR)

(72) Inventor: Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/739,545

(22) Filed: Jan. 10, 2020

(65) Prior Publication Data

US 2020/0229122 A1 Jul. 16, 2020

(30) Foreign Application Priority Data

Jan. 11, 2019 (KR) .................. 10-2019-0004161
Dec. 16, 2019 (KR) .................. 10-2019-0167455

(51) Int. Cl.
| | |
|---|---|
| *H04W 24/00* | (2009.01) |
| *H04W 4/00* | (2018.01) |
| *H04W 64/00* | (2009.01) |
| *H04L 5/00* | (2006.01) |
| *H04B 7/06* | (2006.01) |
| *H04L 1/08* | (2006.01) |

(52) U.S. Cl.
CPC .......... *H04W 64/00* (2013.01); *H04B 7/0682* (2013.01); *H04L 1/08* (2013.01); *H04L 5/0007* (2013.01); *H04L 5/0048* (2013.01); *H04L 5/0094* (2013.01)

(58) Field of Classification Search
CPC .... H04W 64/00; H04L 5/0094; H04L 5/0048; H04L 1/08; H04L 5/0007; H04B 7/0682
USPC ....................................... 455/456.1
See application file for complete search history.

(56) References Cited

U.S. PATENT DOCUMENTS

| | | | |
|---|---|---|---|
| 2012/0044796 A1* | 2/2012 | Yoon .................. | G01S 1/042 370/208 |
| 2012/0165053 A1* | 6/2012 | Yoon .................. | H04L 5/0048 455/501 |
| 2012/0195286 A1* | 8/2012 | Kim .................. | H04L 5/0048 370/330 |
| 2014/0295883 A1* | 10/2014 | Kang .................. | H04W 64/00 455/456.1 |
| 2017/0318554 A1 | 11/2017 | Kim | |
| 2019/0380056 A1* | 12/2019 | Lee .................. | H04L 43/0882 |
| 2019/0394634 A1* | 12/2019 | Akkarakaran .......... | H04L 5/005 |
| 2021/0006372 A1* | 1/2021 | Cha .................. | H04L 5/0048 |

FOREIGN PATENT DOCUMENTS

| | | |
|---|---|---|
| KR | 10-2011-0037430 A | 4/2011 |
| KR | 10-2016-0057336 A | 5/2016 |
| WO | 2018/159967 A1 | 9/2018 |

* cited by examiner

*Primary Examiner* — Mark G. Pannell
(74) *Attorney, Agent, or Firm* — IP Legal Services, LLC

(57) ABSTRACT

Provided are a method and apparatus for performing positioning. The method of a user equipment for performing positioning may include receiving configuration information regarding repeated transmission of a positioning reference signal and repeatedly receiving the positioning reference signal based on the configuration information regarding the repeated transmission.

11 Claims, 18 Drawing Sheets

APPARATUS AND METHOD FOR PERFORMING POSITIONING IN NEW RADIO

CROSS REFERENCE TO RELATED APPLICATION

This application claims priority from Korean Patent Application Nos. 10-2019-0004161 & 10-2019-0167455, filed on Jan. 11, 2019 & Dec. 16, 2019, which are hereby incorporated by reference for all purposes as if fully set forth herein.

BACKGROUND OF THE INVENTION

1. Field of the Invention

The present disclosure relates to a method and apparatus for measuring the position of a user equipment in a next-generation wireless access network (hereinafter referred to as a new radio (NR)).

2. Description of the Prior Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are introduced as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (E.g., subcarrier spacing, subframe, Transmission Time Interval (TTI), etc.) as a method for efficiently satisfying each usage scenario requirement through a frequency band constituting any NR system. In particular, there is a need for a specific design of a positioning reference signal (PRS) to support high resolution and various use cases associated with position measurement for user equipments required in the NR.

SUMMARY OF THE INVENTION

In this background, an aspect of the present disclosure is to provide a method and apparatus for repeatedly transmitting a positioning reference signal in order to perform positioning in a next-generation wireless network.

In accordance with an aspect of the present disclosure, there is provided a method of a user equipment for performing positioning. The method may include receiving configuration information regarding repeated transmission of a positioning reference signal (PRS) and repeatedly receiving the PRS on the basis of the configuration information regarding the repeated transmission.

In accordance with another aspect of the present disclosure, there is provided a method of a base station for performing positioning. The method may include transmitting configuration information regarding repeated transmission of a PRS and repeatedly transmitting the PRS on the basis of the configuration information regarding the repeated transmission.

In accordance with still another aspect of the present disclosure, there is provided a user equipment for performing positioning. The user equipment may include a reception unit configured to receive configuration information regarding repeated transmission of a PRS and repeatedly receive the PRS on the basis of the configuration information regarding the repeated transmission.

In accordance with yet another aspect of the present disclosure, there is provided a base station for performing positioning. The base station may include a transmission unit configured to transmit configuration information regarding repeated transmission of a PRS and repeatedly transmit the PRS on the basis of the configuration information regarding the repeated transmission.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
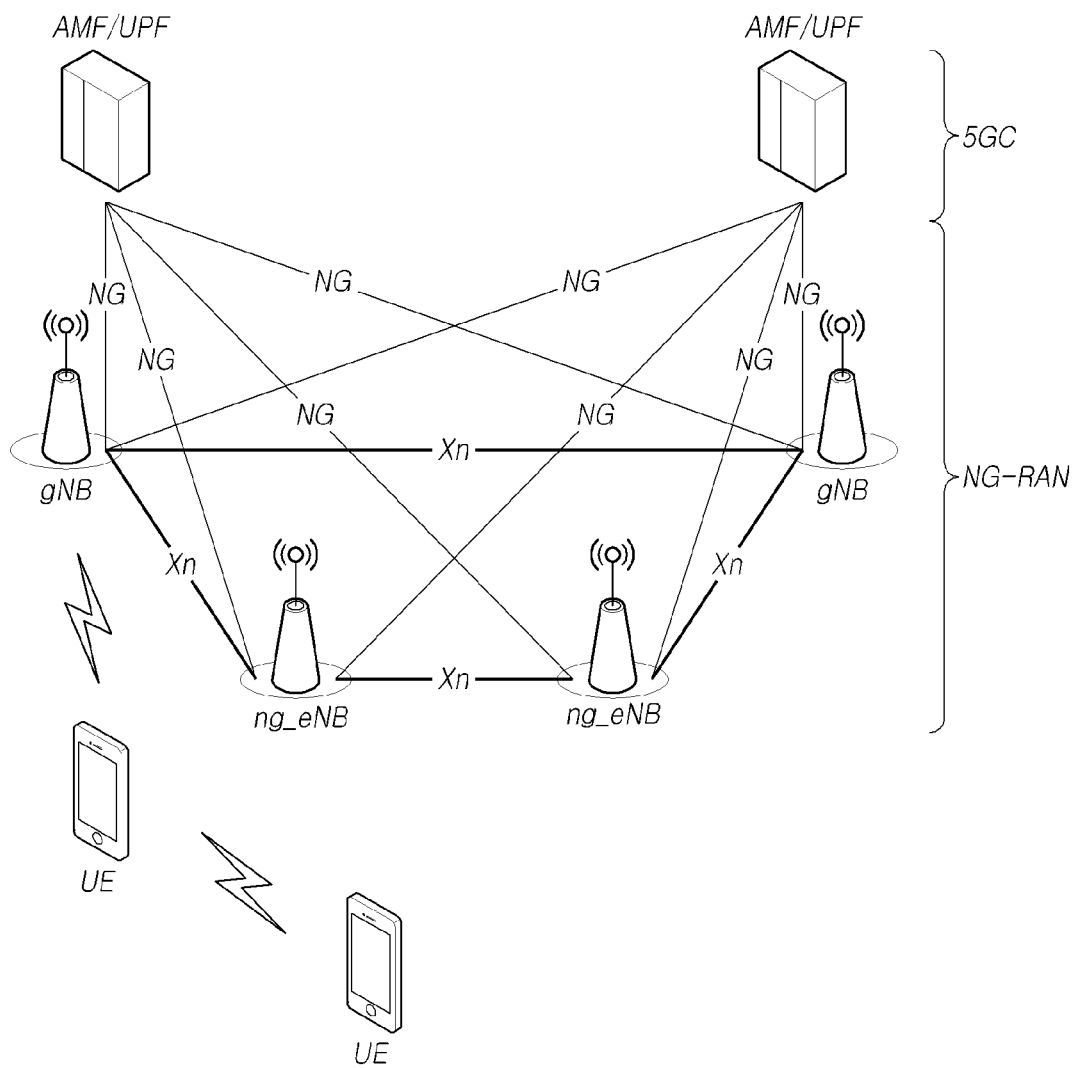
FIG. 1 is a view schematically illustrating an NR wireless communication system.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

A wireless communication system in the specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station, and the base station may be interpreted as two meanings. The base station may be 1) a device for providing a megacell, a macrocell, a microcell, a picocell, a femtocell, or a small cell, or the base station may be 2) a wireless region itself. In the above description 1), the base station may be devices controlled by the same entity and providing predetermined wireless regions or devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH) and a physical uplink control channel (PUCCH). The uplink and downlink transmit and receive data through a data channel such as a physical downlink shared channel (PDSCH) and a physical uplink shared channel (PUSCH). Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP introduced, as a 5G communication technology, i) LTE-A pro by improving the LTE-Advanced technology so as to conform to the requirements of ITU-R and ii) a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, a NR wireless communication system employs a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique has been introduced for efficiently multiplexing radio resources based on a plurality of different numerologies.

Specifically, the NR transmission numerology is determined on the basis of subcarrier spacing and a cyclic prefix (CP), and, as shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
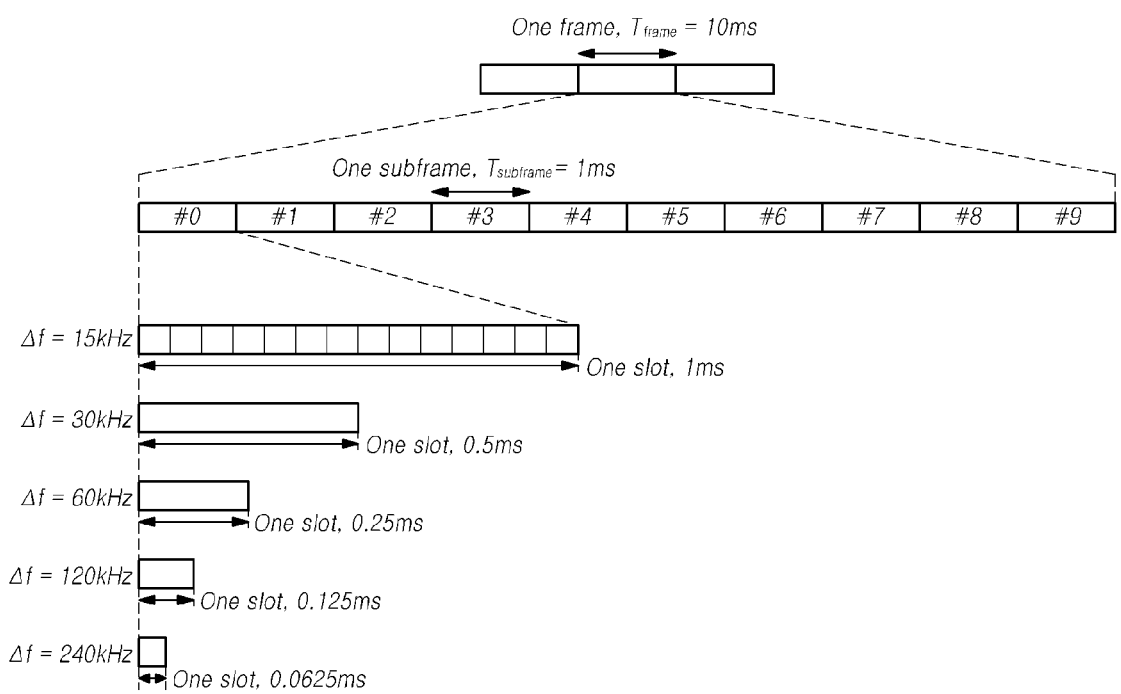
FIG. 2 is a view for explaining a frame structure in an NR system.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In the frame structure of NR, a frame is defined to include 10 subframes each having the same length of 1 ms and have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot is madeup of 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot is madeup of 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port are inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
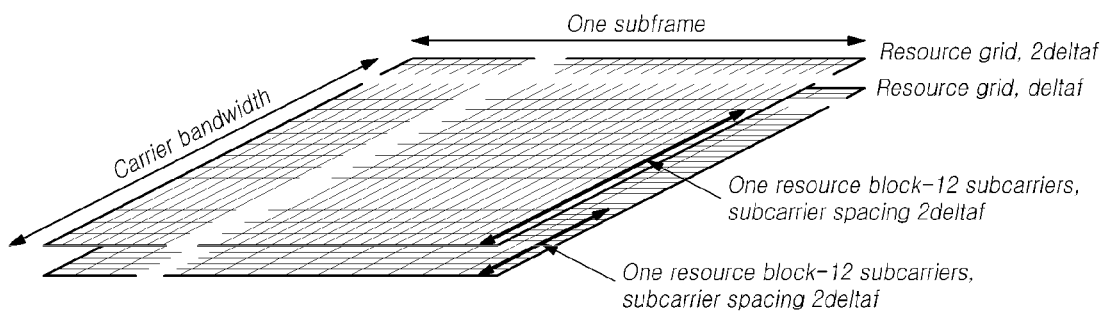
FIG. 3 is a view for explaining resource grids supported by a radio access technology.

FIG. 3 is a view for explaining resource grids supported by a radio access technology.

Referring to FIG. 3, resource grids may vary according to respective numerologies because NR supports a plurality of numerologies in the same carrier. In addition, the resource grids may vary depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may vary according to the subcarrier spacing. Further, "Point A" that acts as a common reference point for the resource block grids, a common resource block, and a virtual resource block are defined in NR.

Figure 4:
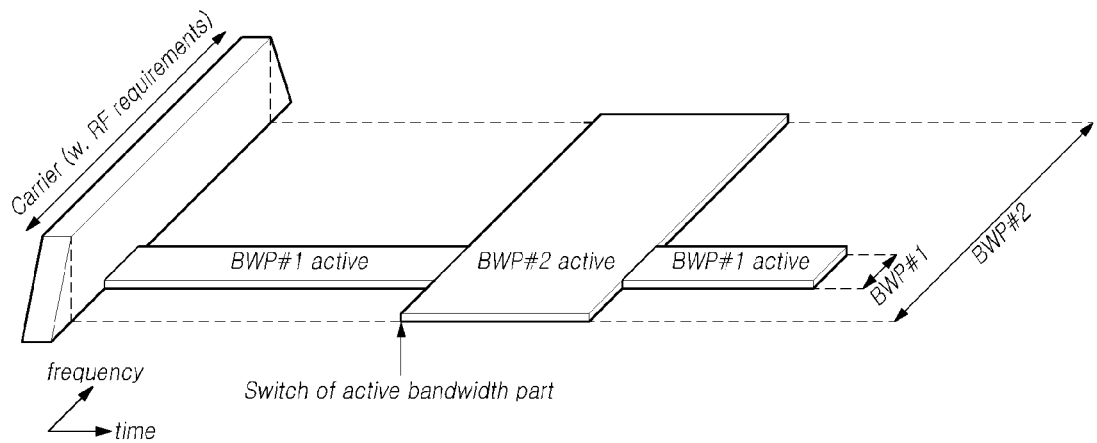
FIG. 4 is a view for explaining bandwidth parts supported by a radio access technology.

FIG. 4 is a view for explaining bandwidth parts supported by a radio access technology.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
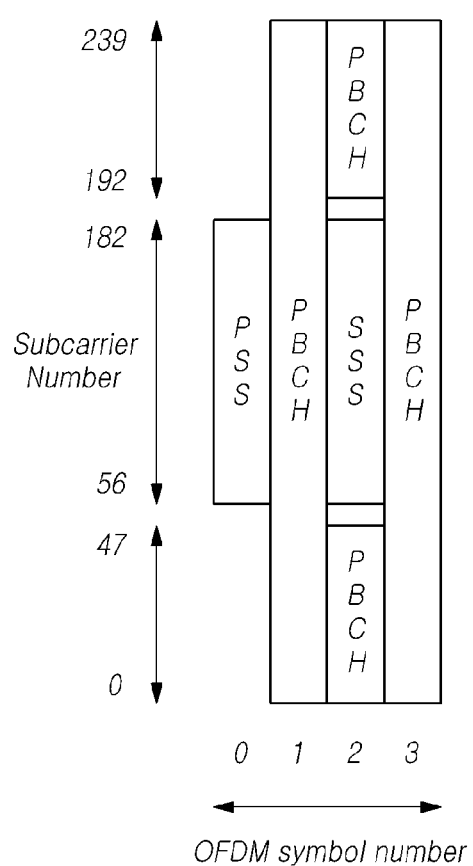
FIG. 5 is a view illustrating an example of a synchronization signal block in a radio access technology.

FIG. 5 is a view illustrating an example of a synchronization signal block in a radio access technology.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining to minimum system information (RMSI) broadcast by the network. In addition, the PBCH may include information on the position of the first DM-RS symbol in the time domain, information for the UE to monitor SIB1 (e.g., SIB1 numerology information, information regarding SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted through a PDSCH. In order to receive SIB1, the UE must receive i) numerology information used for the SIB1 transmission and ii) the CORESET (control resource set) information used for scheduling of SIB1 through a PBCH. The UE identifies scheduling information for SIB1 using SI-RNTI in the CORESET and acquires SIB1 on the PDSCH according to scheduling information. The remaining SIBs other than SIB1 may be periodically transmitted, or the remaining SIBs may be transmitted according to the request of the UE.

Figure 6:
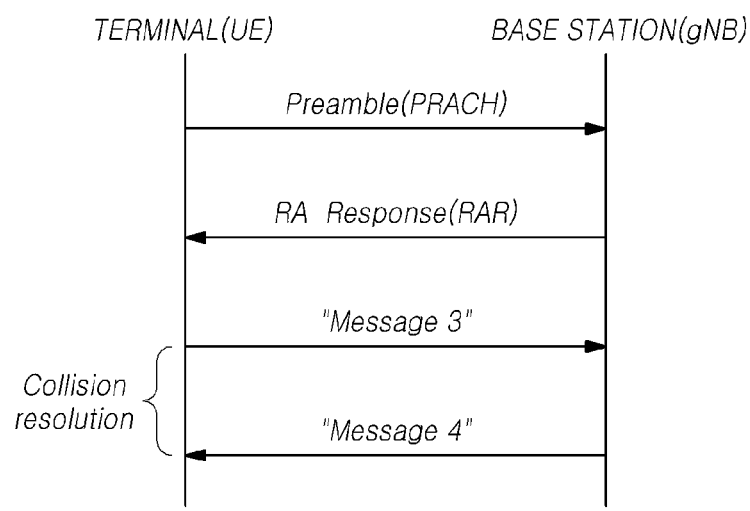
FIG. 6 is a view for explaining a random access procedure in a radio access technology.

FIG. 6 is a view for explaining a random access procedure in a radio access technology.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
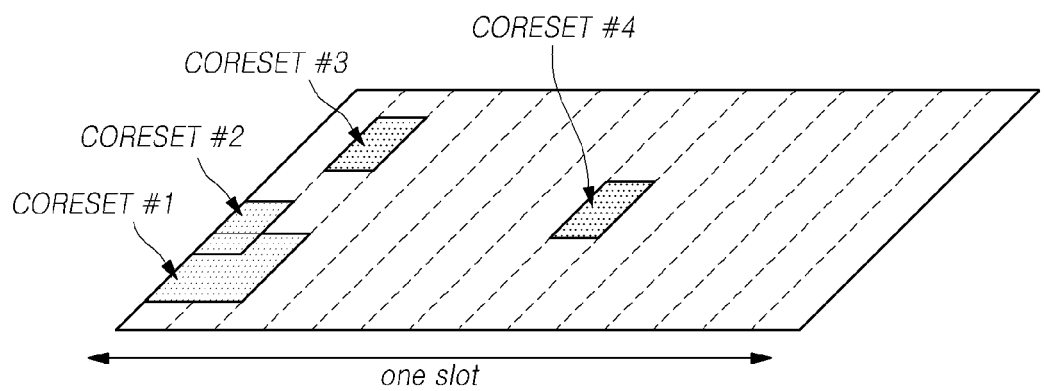
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned, indicated) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

The 3GPP recently approved a study item "Study on New Radio Access Technology" for studying next generation/5G radio access technology. Based on this study item, many discussions have been conducted on a frame structure, channel coding & modulation, waveform & multiple access scheme, and the like for each new radio (NR). Compared to LTE, NR requires a design that can satisfy various Quality of Service (QoS) needs required for segmented and specified usage scenarios as well as improved data transmission rates.

In particular, representative usage scenarios of NR includes enhancement Mobile BroadBand (eMBB), massive Machine Type Communication (mMTC), and Ultra Reliable and Low Latency Communications (URLLC). In order to satisfy requirements of each usage scenario, it is required to design a flexible frame structure in comparison with LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot is defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot may be defined to be made up of fewer OFDM symbols than the slot. Thus, the scheduling for the latency critical data, such as the URLLC, may be performed based on the mini-slot.

Figure 8:
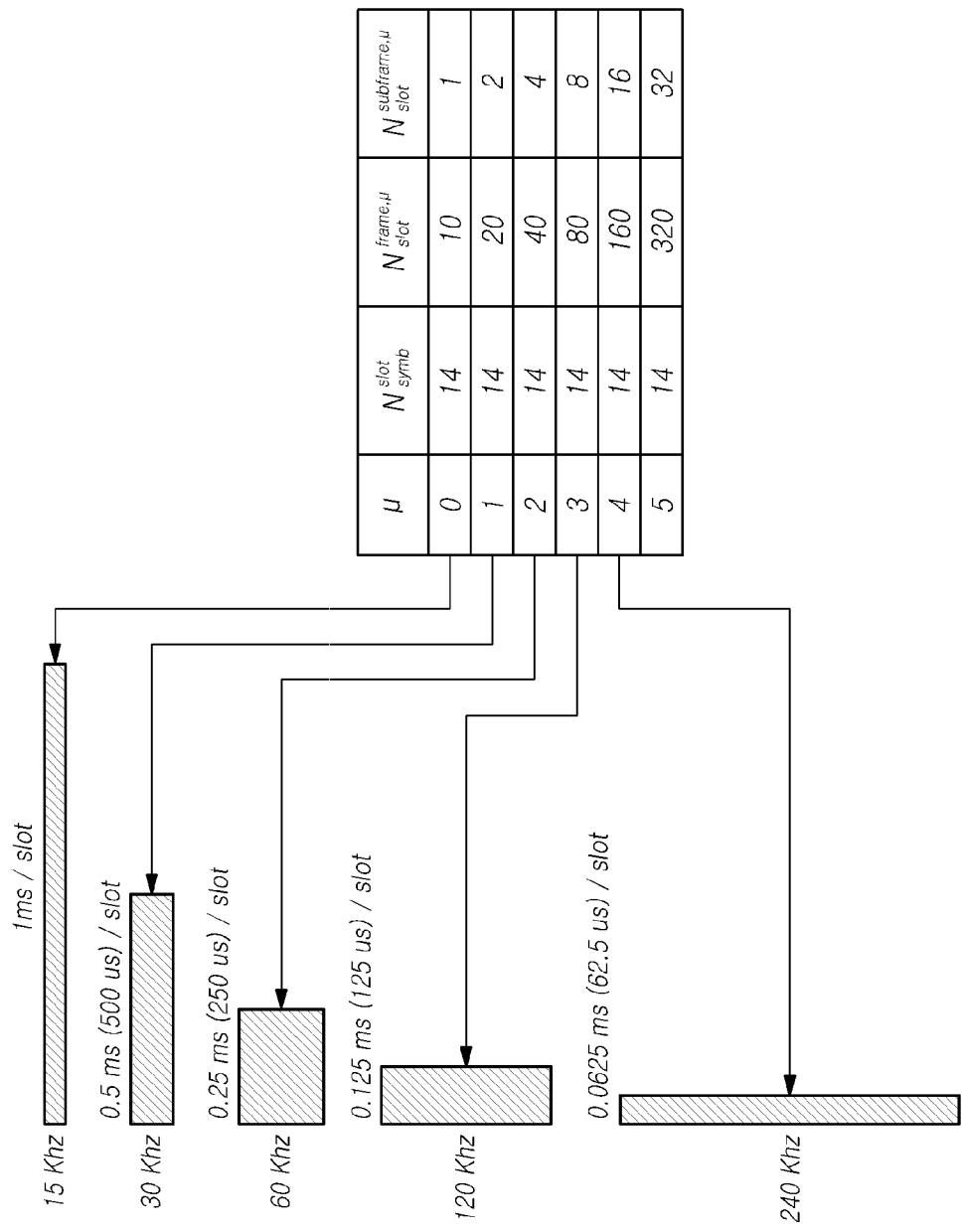
FIG. 8 is a diagram showing an example of symbol level alignment for different subcarrier spacings (SCS)

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

Meanwhile, a channel state information (CSI) provides a channel state for a network using a channel state indicator instead of performing channel estimation through a typical cell-specific RS (CRS). The CSI is specific to a cell but is configured by an RRC signal of a user equipment UE. A channel state information reference signal (CSI-RS) was introduced in LTE Release 10. The CSI-RS is used to estimate a demodulation RS in order for a user equipment to obtain channel state information.

Figure 9:
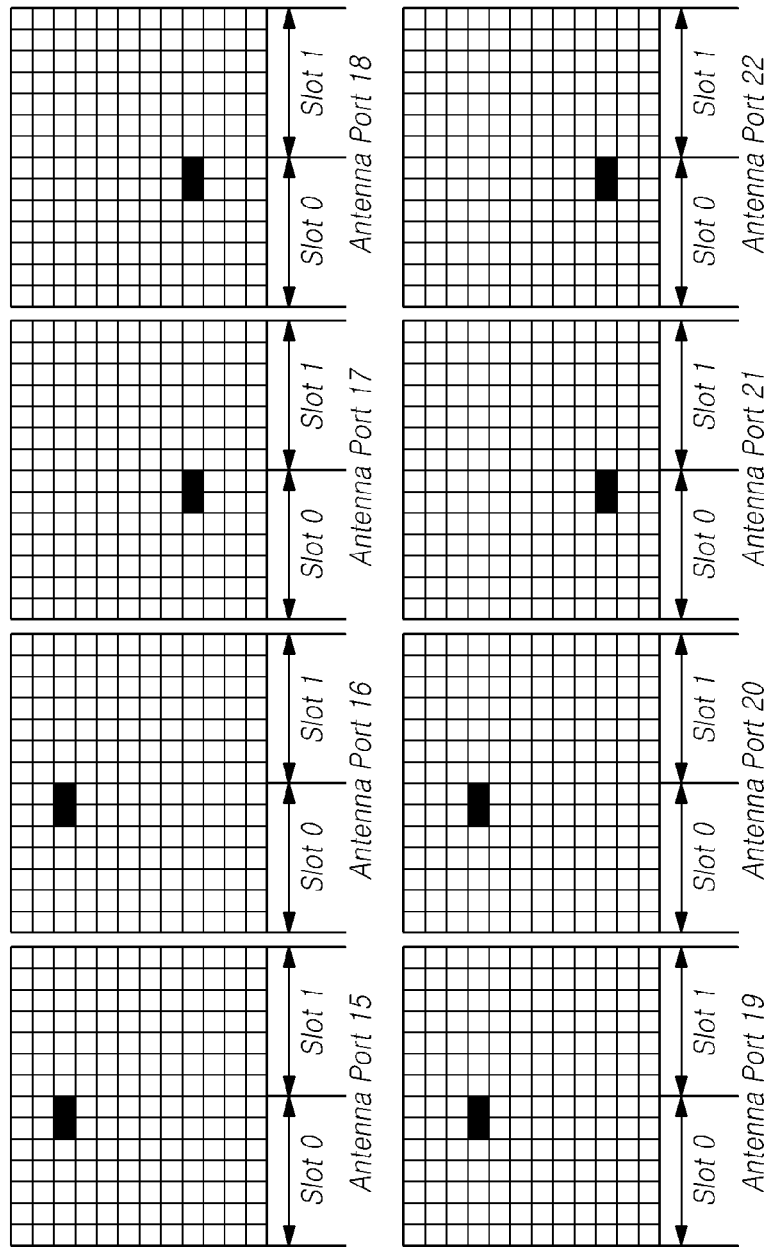
FIG. 9 is a diagram showing an LTE-A CSI-RS structure.

In the typical LTE Rel-8/9, a cell supports up to four CRSs. However, with the evolution to LTE-A (Rel-10), there was a need to extend a CSI for a cell reference signal supporting up to eight layer transmissions. Here, numbers 15 to 22 are assigned to antenna ports as shown in FIG. 9, and a transmission period and mapping for resource allocation are determined through RRC configuration. Table 2 defines a mapping method through CSI-RS configuration in a normal CP.

TABLE 2

Mapping from CSI reference signal configuration to (k', l') for normal cyclic

| CSI reference signal configuration | | Number of CSI reference signals configured | | | | | |
|---|---|---|---|---|---|---|---|
| | | 1 or 2 | | 4 | | 8 | |
| | | (k', l') | $n_S$ mod 2 | (k', l') | $n_S$ mod 2 | (k', l') | $n_S$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |

TABLE 2-continued

Mapping from CSI reference signal configuration to (k', l') for normal cyclic

| | CSI reference signal configuration | Number of CSI reference signals configured | | | | | |
|---|---|---|---|---|---|---|---|
| | | 1 or 2 | | 4 | | 8 | |
| | | (k', l') | $n_S$ mod 2 | (k', l') | $n_S$ mod 2 | (k', l') | $n_S$ mod 2 |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type | 22 | (7, 1) | 1 | (7, 1) | 1 | (7, 1) | 1 |
| 2 only | 23 | (10, 1) | 1 | (10, 1) | 1 | | |
| | 23 | (8, 1) | 1 | (8, 1) | 1 | | |
| | 24 | (6, 1) | 1 | (6, 1) | 1 | | |
| | 25 | (5, 1) | 1 | | | | |
| | 26 | (4, 1) | 1 | | | | |
| | 27 | (3, 1) | 1 | | | | |
| | 28 | (2, 1) | 1 | | | | |
| | 29 | (1, 1) | 1 | | | | |
| | 30 | (0, 1) | 1 | | | | |

In the NR, X-port CSI-RS is finally defined as being allocated to N consecutive/non-consecutive OFDM symbols. Here, the maximum number of X-ports, which are CSI-RS ports, is 32, and symbol N to which CSI-RS is to be allocated has a value of up to four.

Figure 10:
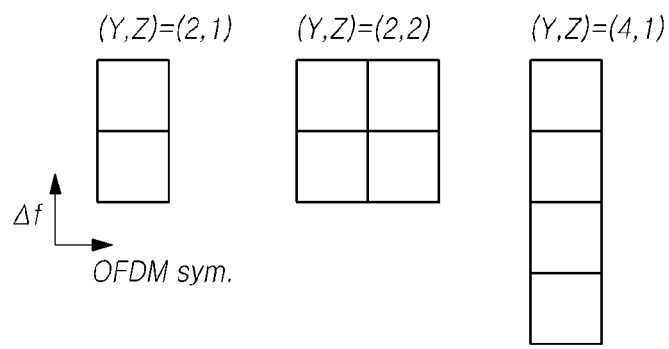
FIG. 10 is a diagram showing NR component CSI-RS RE patterns.

Basically, the CSI-RS has a total of three component resource element (RE) patterns, as shown in FIG. 10. Y and Z represent the frequency axis length and the time axis length of each CSI-RS RE pattern, respectively.

(Y,Z)∈{(2,1), (2,2), (4,1)}

Figure 11:
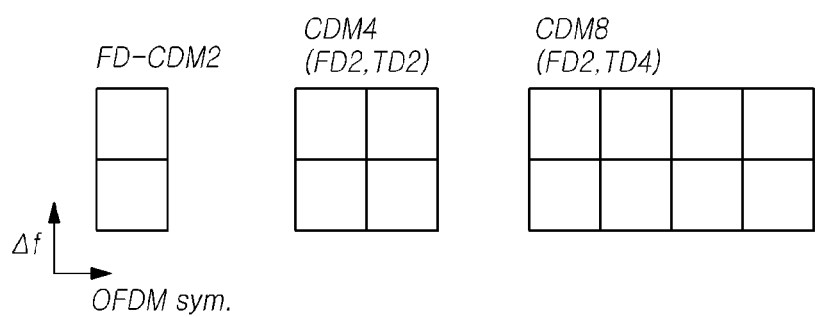
FIG. 11 is a diagram showing an NR CDM pattern.

Also, as shown in FIG. 11, NR supports a total of three CDM patterns.

FD-CDM2, CDM4(FD2,TD2), CDM8(FD2,TD4)

A spreading sequence that is actually allocated to each of the CDM patterns is shown in Tables 3 to 6 below.

TABLE 3

The sequences $w_t(k')$ and $w_t(l')$ for CDMType equal to 'no CDM'

| Index | $w_t(k')$ | $w_t(l')$ |
|---|---|---|
| 0 | 1 | 1 |

TABLE 4

The sequences $w_t(k')$ and $w_t(l')$ for CDMType equal to 'FD-CDM2'

| Index | $w_t(k')$ | $w_t(l')$ |
|---|---|---|
| 0 | [+1 +1] | 1 |
| 1 | [−1 −1] | 1 |

TABLE 5

The sequences $w_t(k')$ and $w_t(l')$ for CDMType equal to 'CDM4'

| Index | $w_t(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 6

The sequences $w_t(k')$ and $w_t(l')$ for CDMType equal to 'CDM8'

| Index | $w_t(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Figure 12:
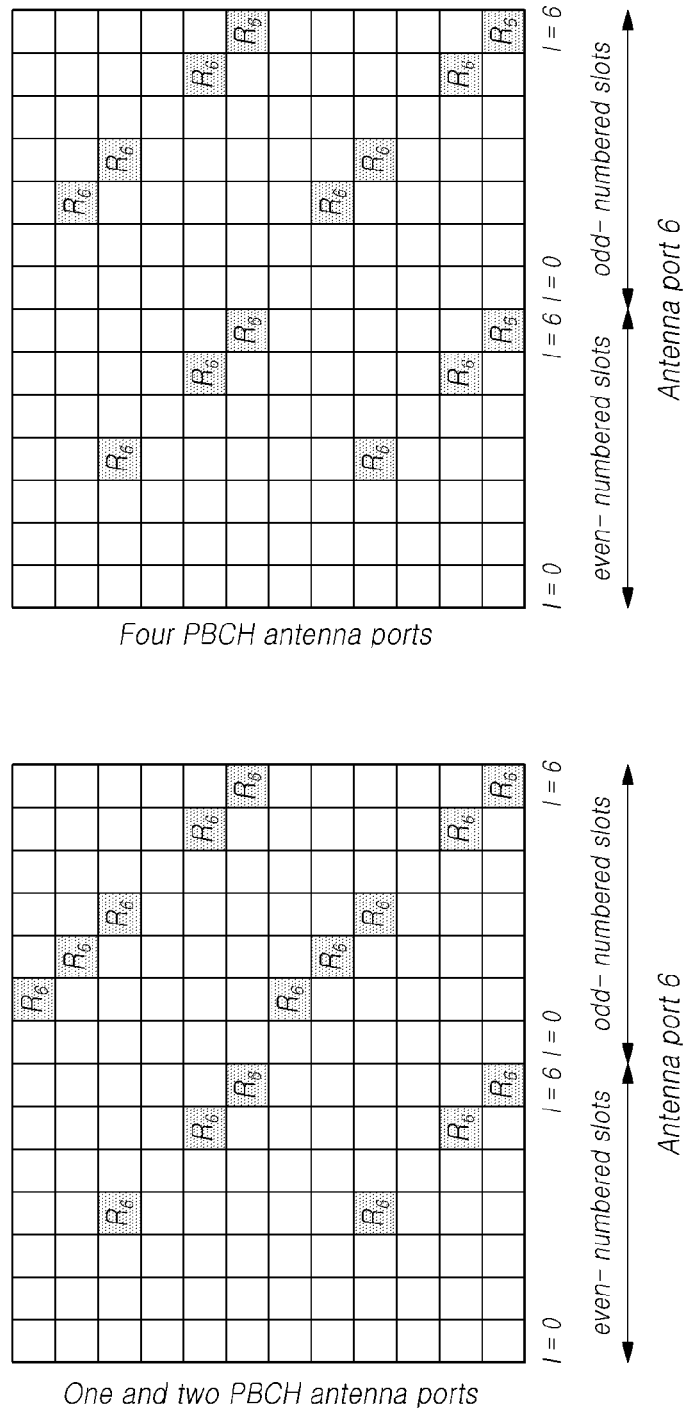
FIG. 12 is a diagram showing the mapping of a positioning reference signal in the case of a normal cyclic prefix to which the embodiment is applicable.

In the typical LTE, higher-layer signaling may be transmitted through antenna port 6 as shown in FIG. 12. By using the higher-layer signaling, a user equipment performs positioning. Basically, a positioning reference signal PRS is transmitted to a pre-defined region through high-layer signaling parameter configuration.

$\Delta_{PRS}$: subframe offset
$T_{PRS}$: Periodicity 160, 320, 640, 1280 subframes
$N_{PRS}$: Duration (No. of consecutive subframes) 1, 2, 4, 6 subframes Basically, the positioning reference signal PRS uses a pseudo random sequence, that is, a quasi-orthogonal characteristic sequence. That is, positioning reference signal (PRS) sequences that overlap in code may be separated using this orthogonal characteristic. In the frequency domain, as shown in FIG. 12, a total of six cells including five adjacent cells may be orthogonally allocated in the frequency domain by using a frequency reuse factor (=6) in the frequency domain. In this case, basically, the position of a PRS RE in the frequency domain uses a physical cell ID (PCI) as an offset value.

Last, a collision occurs when target cells have the same transmission interval as the PRS in the time domain. Accordingly, by configuring a muting interval for each cell, an adjustment may be made such that PRS transmission occurs in an orthogonal time interval between specific cells or cell groups.

Figure 13:
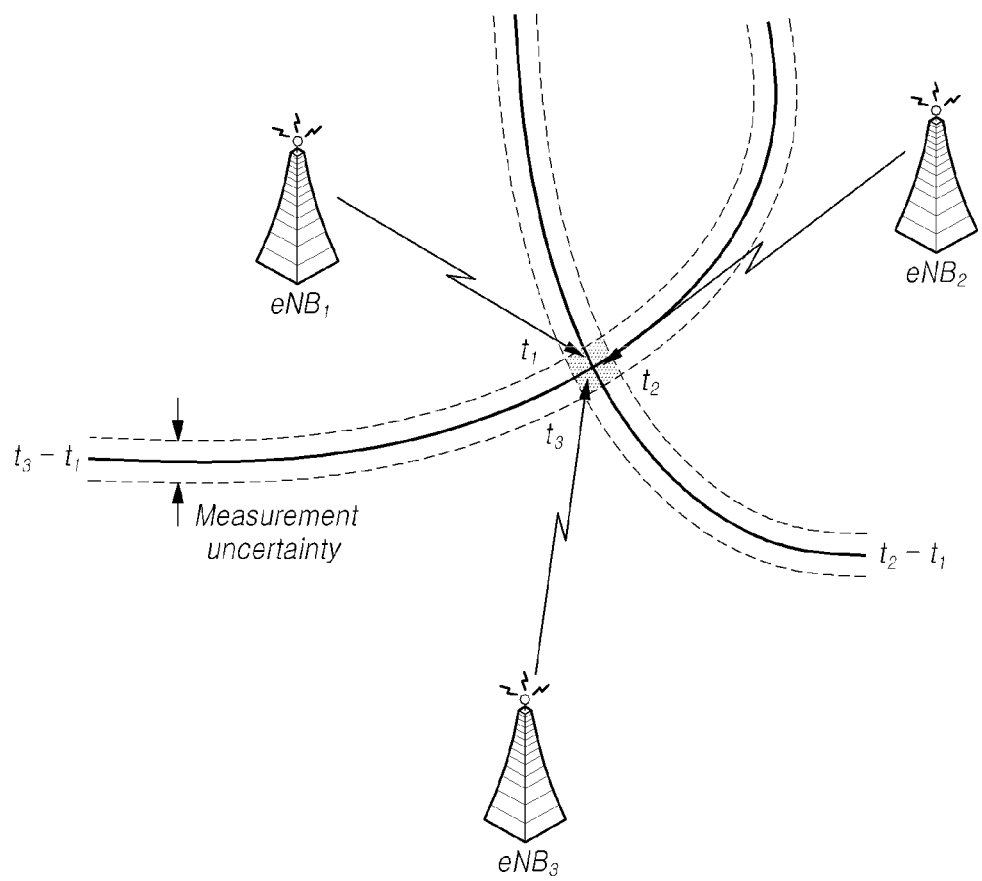
FIG. 13 is a conceptual view of OTDOA-based positioning.

A basic principle of positioning representatively includes observed time difference of arrival (OTDOA) for estimating a received signal time difference (RSTD). The basic principle is to estimate the position of a user equipment by estimating an intersection area based on a time difference from at least three cells as shown in FIG. 13 below. In the PRS, PRS transmission information for up to 24×3 (3-sector) cells may be configured for a user equipment through higher layer signaling.

Also, the user equipment should report RSTD values estimated on cells to a base station. The following table shows values that are used to report a time difference value estimated by the user equipment.

Basically, an interval between −15391 Ts and 15391 Ts is defined as a reporting range. At −4096 $T_s$, an interval of RSTD≤4096≤$T_s$ has a resolution of 1 $T_s$, and the remaining interval has a resolution of 5 $T_s$.

TABLE 7

RSTD report mapping

| Reported Value | Measured Quantity Value | Unit |
| --- | --- | --- |
| RSTD_0000 | −15391 > RSTD | $T_S$ |
| RSTD_0001 | −15391 ≤ RSTD < −15386 | $T_S$ |
| ... | ... | ... |
| RSTD_2258 | −4106 ≤ RSTD < −4101 | $T_S$ |
| RSTD_2259 | −4101 ≤ RSTD < −4096 | $T_S$ |
| RSTD_2260 | −4096 ≤ RSTD < −4095 | $T_S$ |
| RSTD_2261 | −4095 ≤ RSTD < −4094 | $T_S$ |
| ... | ... | ... |
| RSTD_6353 | −3 ≤ RSTD < −2 | $T_S$ |
| RSTD_6354 | −2 ≤ RSTD < −1 | $T_S$ |
| RSTD_6355 | −1 ≤ RSTD < 0 | $T_S$ |
| RSTD_6356 | 0 < RSTD ≤ 1 | $T_S$ |
| RSTD_6357 | 1 < RSTD ≤ 2 | $T_S$ |
| RSTD_6358 | 2 < RSTD ≤ 3 | $T_S$ |
| ... | ... | ... |
| RSTD_10450 | 4094 < RSTD ≤ 4095 | $T_S$ |
| RSTD_10451 | 4095 < RSTD ≤ 4096 | $T_S$ |
| RSTD_10452 | 4096 < RSTD ≤ 4101 | $T_S$ |
| RSTD_10453 | 4101 < RSTD ≤ 4106 | $T_S$ |
| ... | ... | ... |
| RSTD_12709 | 15381 < RSTD ≤ 15386 | $T_S$ |
| RSTD_12710 | 15386 < RSTD ≤ 15391 | $T_S$ |
| RSTD_12711 | 15391 < RSTD | $T_S$ |

Additionally, the reporting for high resolution is also included in the standard, and the corresponding contents are shown in Table 8 below. This value may be transmitted in addition to the above-estimated RSTD. The reporting may be performed using RSTD_delta_0 and RSTD_delta_1 in an interval of −2260 $T_s$≤RSTD≤10451 $T_s$ and may be performed using all the values except RSTD_delta_1 in intervals of 0000 $T_s$≤RSTD≤2259 $T_s$ and 10452 $T_s$≤RSTD≤12711 $T_s$. For reference, 1 $T_s$ means about 9.8 m. The calculation based on 15 kHz, which is a subcarrier spacing of the LTE, is as follows.

SCS=15 kHz, reference OFDM symbol length=66.7 us 2048 samples are generated on time axis based on 2048FFT (criterion for not oversampling)

Length per sample on time axis (=1 $T_s$)=66.7 us/2048 samples in time*(3*108 m/s)=9.8 m

TABLE 8

Relative quantity mapping for higher-resolution RSTD measurement reporting

| Reported Relative Qkuantity Value | Measured Relative Quantity Value, $\Delta_{RSTD}$ | Unit |
| --- | --- | --- |
| RSTD_delta_0 | 0 | $T_S$ |
| RSTD_delta_1 | 0.5 | $T_S$ |
| RSTD_delta_2 | 1.0 | $T_S$ |
| RSTD_delta_3 | 2.0 | $T_S$ |
| RSTD_delta_4 | 3.0 | $T_S$ |
| RSTD_delta_5 | 4.0 | $T_S$ |

Typical LTE positioning does not consider feeding back beam-based information on both ends of transmission and reception. The present disclosure introduces an azimuth-based positioning information feedback method for 5G NR A method of performing positioning by applying an NR beam-based transmission scheme to both of a transmitting side and a receiving side will be described in detail below with reference to relevant drawings.

A method of repeatedly transmitting a positioning reference signal in order to perform positioning in a next-generation wireless network will be described below with reference to relevant drawings.

Figure 14:
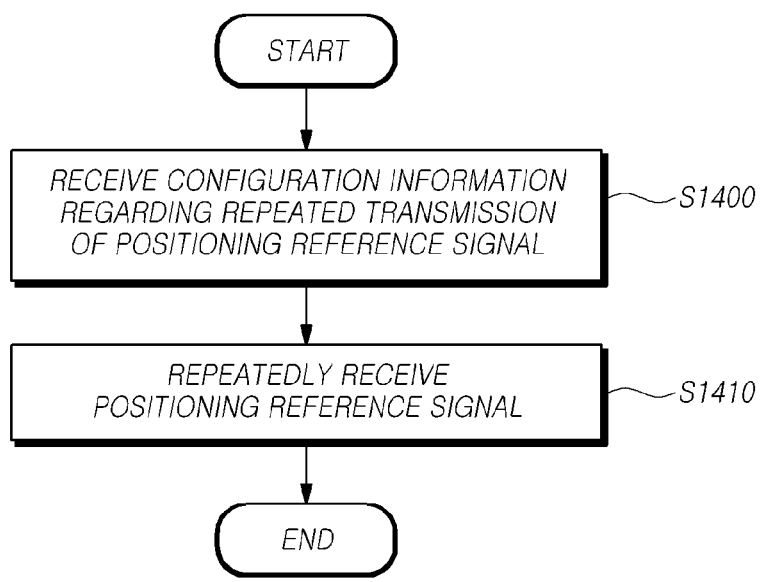
FIG. 14 is a diagram showing a procedure of a user equipment for performing positioning according to an embodiment.

FIG. 14 is a diagram showing a procedure of a user equipment for performing positioning according to an embodiment.

Referring to FIG. 14, a user equipment may receive configuration information regarding repeated transmission of a PRS (S1400).

In order to support various usage scenarios required by an NR and to provide higher resolution than before, positioning may be performed using directionality information, such as an angle of arrival or an angle of departure of beams at transmission and reception ends as well as the typical positioning performed based on a time difference. Assuming that beam-based transmission is performed, Tx beam index information or Rx beam index information may be included in feedback information for the positioning reference signal. On the basis of a beam sweeping operation, the Tx beam index information may refer to azimuth information at the transmission end, and the Rx beam index information may refer to azimuth information at the reception end.

Basically, beam information fed back to a base station by a user equipment refers to information on Tx beams that are transmitted by the base station and measured by the user equipment. For the positioning based on azimuth information, information on Rx beams is not necessary when a user equipment and a base station are in a Line of Sight (LOS) environment but is further necessary when a user equipment and a base station are in a Non-LOS (NLOS) environment.

Accordingly, the user equipment may receive configuration information regarding a positioning reference signal from the base station in order to perform Rx beamforming. In particular, a positioning reference signal transmitted from the base station may be repeatedly transmitted with respect to the same beam during a certain time interval in order for the user equipment to perform beam sweeping. Thus, the configuration information regarding the positioning reference signal may include configuration information regarding the repeated transmission of the positioning reference signal.

For example, the configuration information regarding the repeated transmission may be received through higher layer signaling. However, this is merely one example, and the configuration information regarding the repeated transmission may be managed or delivered to a user equipment through an NR positioning protocol-based configuration signal.

The configuration information regarding the repeated transmission of the positioning reference signal may include information on an interval for repeating the same beam. That is, the configuration information regarding the repeated transmission may include information on a time interval unit for repeatedly transmitting the positioning reference signal. Also, the configuration information regarding the repeated transmission may include information on the number of repeated transmissions of the positioning reference signal in the time interval unit for repeatedly transmitting the positioning reference signal.

For example, the time interval unit for repeatedly transmitting the positioning reference signal may be set to one of a slot unit, a mini-slot unit, and a symbol unit. For example, the repeatedly transmitted positioning reference signal may include N slot units (N is a natural number of one or more). In the case of a single symbol unit, a positioning reference signal in a slot may be repeatedly transmitted in units of a symbol.

When configuration information regarding the time interval for repeatedly transmitting the positioning reference signal is received, the user equipment may perform Rx beam sweeping on the interval for repeatedly transmitting the positioning reference signal. The user equipment may derive an angle of reception or an Rx beam index from a time interval in which Reference Signal Received Power/Signal to Noise Ratio (RSRP/SNR) is maximal by means of the Rx beam sweeping. In the case of a single symbol unit, for example, the user equipment may derive an angle of reception or an Rx beam index from a symbol in which RSRP/SNR is maximal.

For example, NR downlink PRS resources may be defined as a set of resource elements that are used for NR downlink PRS transmission and that may span multiple physical resource blocks (PRBs) within N consecutive symbols in one slot.

For example, a parameter DL-PRS-ResourceRepetition-Factor may be configured for a downlink PRS resource set and may control the number of times each DR-PRS resource is repeated for a single instance of the DL-PRS resource set. In this case, the number of repetitions may be set to one of 1, 2, 4, 6, 8, 16, or 32.

Also, according to an embodiment, a parameter DL-PRS-ResourceTimeGap may be configured for a downlink PRS resource set. DL-PRS-ResourceTimeGap may indicate an offset in units of a slot between two repetitive instances of a downlink PRS resource corresponding to the same downlink PRS resource ID in a single instance of the downlink PRS resource set. In this case, DL-PRS-ResourceTimeGap may have a value of 1, 2, 4, 8, 16, or 32 only when DL-PRS-ResourceRepetitionFactor is configured and has a value of more than one.

Also, the time duration of one DL PRS resource set including a repeated downlink PRS resource may be configured to exceed DL-PRS-Periodicity, which is the transmission period of the downlink PRS.

Also, the configuration information regarding the positioning reference signal may further include transmission pattern information of the positioning reference signal in the PRS resource, configuration information regarding a SCS of a frequency band for transmitting the positioning reference signal, or the like.

The transmission pattern information may be flexibly configured to satisfy various usage scenarios of the NR That is, the positioning reference signal may be transmitted on radio resources in various patterns depending on the use case of the user equipment.

At least one of time domain allocation information, frequency domain allocation information, and a transmission pattern index for the transmission of the positioning reference signal may be configured in a plurality of different patterns. That is, configuration information regarding the transmission pattern of the positioning reference signal may include density information that is related to the density of the positioning reference signal in the frequency domain and that indicates the number of REs configured for one OFDM symbol per PRB. Also, the configuration information regarding the transmission pattern of the positioning reference signal may include density information that is related to the density of the positioning reference signal in the frequency domain and that indicates the number of OFDM symbols through which the positioning reference signal is transmitted per slot.

In this case, the configuration information regarding the transmission pattern of the positioning reference signal may include location information that is related to the location of the positioning reference signal in the time domain and that indicates the location of an OFDM symbol on which the positioning reference signal is transmitted. Also, the configuration information regarding the transmission pattern of the positioning reference signal may include starting point information indicating the starting point of a positioning reference signal RE in the time domain and starting point information indicating an OFDM symbol at which the transmission of the positioning reference signal is started in the time domain.

Also, the configuration information regarding the subcarrier spacing may include information regarding numerology for the frequency band for transmitting the positioning reference signal. As the subcarrier spacing value of the numerology increases, the resolution value provided by one time sample of the positioning reference signal PRS may decrease, and thus positioning resolution may increase. Accordingly, the numerology for the frequency band for transmitting the positioning reference signal may be configured on the basis of the resolution of the positioning reference signal required for each use case.

Referring to FIG. 14 again, the user equipment may repeatedly receive the positioning reference signal on the basis of configuration information regarding repeated transmission (S1410).

The user equipment may receive the positioning reference signal using radio resources allocated for the transmission of the positioning reference signal on the basis of the configuration information regarding the positioning reference signal. The user equipment may receive the positioning reference signal on the basis of the configuration information regarding the subcarrier spacing of the frequency band for transmitting the positioning reference signal, the transmission pattern information of the positioning reference signal, or the configuration information regarding the repeated transmission of the positioning reference signal included in the configuration information regarding the positioning reference signal.

In particular, the user equipment may repeatedly receive the positioning reference signal on the basis of the number of repeated transmissions of the positioning reference signal in a time interval for repeatedly transmitting the positioning reference signal. When configuration information regarding the time interval for repeatedly transmitting the positioning reference signal is received, the user equipment may perform Rx beam sweeping on the interval for repeatedly transmitting the positioning reference signal. The user equipment may derive an angle of reception or an Rx beam index from a time interval in which RSRP/SNR is maximal by means of the Rx beam sweeping.

The user equipment may transmit Rx beam index information regarding the positioning reference signal to a base station. The base station may measure the location of the user equipment on the basis of the corresponding Rx beam index information.

The above description relates to horizontal positioning. According to an embodiment, however, substantially the same contents as described above may also be applied to a case in which the vertical location of the user equipment is measured as long as there is no contradiction with the technical spirit. That is, when the positioning reference signal is transmitted using vertical beams, the user equipment may receive the configuration information regarding the repeated transmission to the base station. The user equipment may perform vertical Rx beam sweeping on the interval for repeatedly transmitting the positioning reference signal on the basis of the corresponding configuration information.

Thus, it is possible to provide a method and apparatus for repeatedly transmitting the positioning reference signal in order to perform positioning in a next-generation wireless network in accordance with embodiments of the present disclosure. In particular, by performing the Rx beam sweeping on a positioning reference signal that is repeatedly transmitted using the same beam during a certain time interval, it is possible to perform more accurate and efficient positioning.

Figure 15:
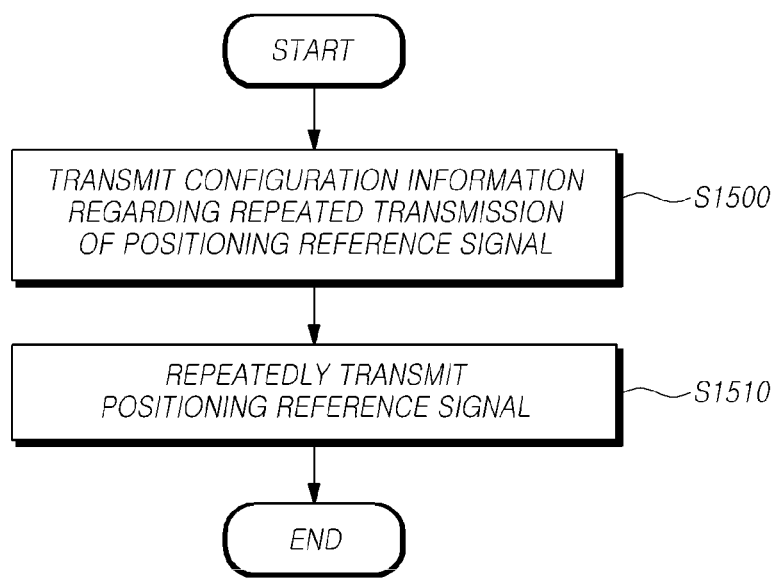
FIG. 15 is a diagram showing a procedure of a base station for performing positioning according to an embodiment.

FIG. 15 is a diagram showing a procedure of a base station for performing positioning according to an embodiment.

Referring to FIG. 15, the base station may transmit the configuration information regarding the repeated transmission of the positioning reference signal (S1500).

The base station may transmit, to the user equipment, configuration information that is related to the positioning reference signal and that is necessary for the transmission of the positioning reference signal. The base station may repeatedly transmit the positioning reference signal using the same beam during a predetermined time interval. Thus, the configuration information regarding the positioning reference signal may include the configuration information regarding the repeated transmission of the positioning reference signal.

For example, the configuration information regarding the repeated transmission may be transmitted through higher layer signaling. However, this is merely one example, and the configuration information regarding the repeated transmission may be managed or transmitted to a user equipment through an NR positioning protocol-based configuration signal.

The configuration information regarding the repeated transmission of the positioning reference signal may include information regarding an interval for repeating the same beam. That is, the configuration information regarding the repeated transmission may include information regarding a time interval unit for repeatedly transmitting the positioning reference signal. Also, the configuration information regarding the repeated transmission may include information regarding the number of repeated transmissions of the positioning reference signal in the time interval unit for repeatedly transmitting the positioning reference signal.

For example, the time interval unit for repeatedly transmitting the positioning reference signal may be set to be one of a slot unit, a mini-slot unit, and a symbol unit. For example, the repeatedly transmitted positioning reference signal may include N slot units (N is a natural number of one or more). In the case of a single symbol unit, a positioning reference signal in a slot may be repeatedly transmitted in units of a symbol.

Also, the configuration information regarding the positioning reference signal may further include the transmission pattern information of the positioning reference signal in the PRS resource, the configuration information regarding the subcarrier spacing of the frequency band in which the positioning reference signal is transmitted, or the like.

The transmission pattern information may be flexibly configured to satisfy various usage scenarios of the NR That is, the positioning reference signal may be transmitted on radio resources in various patterns depending on the use case of the user equipment.

At least one of time domain allocation information, frequency domain allocation information, and a transmission pattern index for the transmission of the positioning reference signal may be configured in a plurality of different patterns. That is, the configuration information regarding the transmission pattern of the positioning reference signal may include density information that is related to the density of the positioning reference signal in the frequency domain and that indicates the number of REs configured for one OFDM symbol per PRB. Also, the configuration information regarding the transmission pattern of the positioning reference signal may include density information that is related to the density of the positioning reference signal in the frequency domain and that indicates the number of OFDM symbols through which the positioning reference signal is transmitted per slot.

In this case, the configuration information regarding the transmission pattern of the positioning reference signal may include location information that is related to the location of the positioning reference signal in the time domain and that indicates the location of an OFDM symbol on which the positioning reference signal is transmitted. Also, the configuration information regarding the transmission pattern of the positioning reference signal may include starting point information indicating the starting point of a positioning reference signal RE in the time domain and starting point information indicating an OFDM symbol at which the transmission of the positioning reference signal is started in the time domain.

Also, the configuration information regarding the subcarrier spacing may include information regarding numerology for the frequency band in which the positioning reference signal is transmitted. As the subcarrier spacing value of the numerology increases, the resolution value provided by one time sample of the positioning reference signal may decrease, and thus positioning resolution may increase. Accordingly, the numerology for the frequency band for transmitting the positioning reference signal may be configured on the basis of the resolution of the positioning reference signal required for each use case.

Referring to FIG. 15 again, the base station may repeatedly transmit the positioning reference signal on the basis of the configuration information regarding the repeated transmission (S1510).

The base station may transmit the positioning reference signal using radio resources allocated for the transmission of the positioning reference signal on the basis of the configuration information regarding the positioning reference signal. The base station may transmit the positioning reference signal on the basis of the configuration information regarding the subcarrier spacing of the frequency band for transmitting the positioning reference signal, the transmission pattern information of the positioning reference signal, or the configuration information regarding the repeated transmission of the positioning reference signal included in the configuration information regarding the positioning reference signal.

In particular, the base station may repeatedly transmit the positioning reference signal on the basis of the number of repeated transmissions of the positioning reference signal in a time interval for repeatedly transmitting the positioning reference signal. When the configuration information regarding the time interval for repeatedly transmitting the positioning reference signal is received, the user equipment may perform Rx beam sweeping on the interval for repeatedly transmitting the positioning reference signal. The user equipment may derive an angle of reception or an Rx beam index from a time interval in which RSRP/SNR is maximal by means of the Rx beam sweeping.

The user equipment may transmit Rx beam index information regarding the positioning reference signal to the base station. The base station may measure the location of the user equipment on the basis of the corresponding Rx beam index information.

Thus, it is possible to provide a method and apparatus for repeatedly transmitting the positioning reference signal in order to perform positioning in a next-generation wireless network in accordance with embodiments of the present disclosure.

An embodiment related to the repeated transmission of the positioning reference signal for positioning and related to feedback of beam-based information at both of transmission and reception ends will be described in detail below.

A use case that is mainly introduced in association with the NR positioning basically refers to positioning use case and accuracy in TR 22.862. This is summarized in Table 9 below.

TABLE 9

| SMARTER Use Cases and Potential Positioning Requirements | |
|---|---|
| Use case | Accuracy |
| Higher accuracy positioning outdoor with high speed moving | <1 m Up to 200 km/h |
| Higher accuracy positioning with low speed moving (including indoor and outdoor) | <1 m Indoor and Outdoor |
| Higher accuracy positioning for low altitude UAV in critical condition (e.g. Drones) | Remote control(Outdoor): 0.5 m Horizontal0.3 m Vertical Data analysis(Outdoor): 0.1 m Horizontal0.1 m Vertical |

TABLE 9-continued

| SMARTER Use Cases and Potential Positioning Requirements | |
|---|---|
| Use case | Accuracy |
| Higher accuracy positioning for mioT | Wearables(Outdoor/Indoor): 2 m Horizontal Patient location (in Hospital): 3 m Horizontal Patient location (out Hospital): 200 m Horizontal |

Summarizing NR requirements, it can be seen that higher resolution than that of LTE should be provided and also various use cases should be supported. In addition, some scenarios require three-dimensional positioning.

Accordingly, information regarding a vertical or horizontal direction should be provided in addition to a typical OTDOA-based time difference. At the same time, it is also necessary to provide single-cell-based positioning information on the basis of beam information and a value related to signal strength.

Also, a phase difference of arrival (PDOA), which is newly discussed as a candidate technology, is a relative concept of the typical OTDOA (time difference) and may estimate a distance between a base station (gNB) and a UE by estimating a phase difference. Here, PDOA should be transmitted over a broad band to derive the entire phase difference, thus allowing accurate distance estimation.

A directionality positioning method will be proposed on the basis of the above-described various candidate technologies and use cases of the NR PRS. The directionality positioning refers to a method of utilizing positioning based on azimuth such as an angle of arrival (AOA) or angel of departure (AOD). Since NR basically assumes beam-based operation, such azimuth-based information may be replaced based on beam-based information.

Embodiment 1: A User Equipment Feeds Rx Beam Information Out of its Own Positioning Information Back to a Base Station In the positioning feedback of the typical LTE, the user equipment feeds cell ID and RSTD back to the base station on the basis of OTDOA. Since NR basically assumes that all transmissions are based on beams, the user equipment needs a new positioning feedback format including corresponding beam reception information. Accordingly, as shown in Table 10, Tx/Rx beam index information may be newly included in PRS feedback information unlike before. Here, as a result, Tx/Rx beam indices are information indicating Tx/Rx azimuth angles, respectively. A direct azimuth value may be transmitted instead of a beam index. In this case, when the user equipment directly feeds the azimuth back, a feedback table may be defined as a table corresponding to determined resolution (a quantization level) or the like.

TABLE 10

| Case | Cell Information (e.g. PCID, ECID) | Time difference (e.g. RSTD) | Signal Strength (e.g. RSRP) | Tx-Beam index | Rx-Beam index |
|---|---|---|---|---|---|
| LTE | ○ | ○ | X | X | X |
| NR | ○ | ○ | X | ○ (SSB index, CSI-RS resource index 사용) | X |
| NR-추가 | ○ | ○ | ○ (New feature) | ○ (상동) | ○ (New feature) |

Generally, azimuth-based information has increased utilization in a single-cell environment. For example, when a 5G base station is in an isolated environment or when no base stations are in adjacent regions, the utilization of the azimuth-based positioning increases.

Basically, beam information fed back to a base station (gNB) by a user equipment (UE) refers to information regarding Tx beams that are transmitted by the gNB and measured by the user equipment. However, the positioning based on the directionality information requires more azimuth information regarding Rx beams. The user equipment and the base station do not need the azimuth information regarding the Rx beams in the LOS environment, but cannot estimate the accurate location of the user equipment using only Tx beam information of the gNB in the Non-LOS (NLOS) environment. Accordingly, the active configuration of the gNB for the Rx beam estimation of the UE is required.

Basically, this method is the most necessary characteristic for single-cell positioning. In a band of 6 GHz or higher, which is the FR2 region of NR, many cells may not be deployed. In this case, there is no problem in performing positioning between the UE and the gNB in the LOS. However, in the NLOS, accurate positioning may be performed only when cross information of Tx/Rx beams is known. Accordingly, the user equipment should feed feedback information of Rx beams back in any form.

As the Rx beam feedback method, the following method may be applied.

According to an embodiment, the feedback of the Rx beams may be performed using a sounding reference signal (SRS) resource index.

Basically, the UE has a much smaller Rx antenna than the gNB. That is, the Rx beam of the user equipment is coarser than Tx beams. Accordingly, basically, N NR PRS indices and M SRS resource indices may be paired (N>M). Typically, multiple (N) PRS indices may be paired with a signal SRS resource index. For example, PRS index #0, #1, and #2 may be paired with SRS index #0.

According to another example, PRACH, DMRS, and UL PRS may have the same beam pairing characteristics as SRS. That is, the feedback of the Rx beam may be performed using a PRACH resource index, an UL DMRS index, or an UL PRS beam/resource index or implicit feedback may be performed using QCL linkage/beam correspondence.

In NR, a linkage for each resource is formed on the basis of similarity and paring between beams. Here, basically, UL Rx beam information may be replaced with DL Tx beam linkage information. For example, when an Rx beam corresponding to SRS resource index #0 is selected as the most optimal Rx beam, SSB index #0 or CSR-RS resource index #0 paired with SRS index #0 of the user equipment with respect to beams may be fed back.

Embodiment 1-1: NR PRS Supports a Configuration that Certainly Includes an Interval in which the Same Beam is Repeated For the purpose of Rx beamforming of the user equipment, an NR positioning signal transmitted from the gNB should have the following characteristics.

It is necessary to configure an interval for the consecutive transmission of a PRS, and the user equipment may perform Rx beam sweeping in the corresponding interval. The corresponding interval configuration may be managed or delivered to a user equipment through an NR positioning protocol-based configuration signal or through higher-layer PRS configuration.

A unit for repeatedly transmitting the PRS may be set to one of a slot unit, a mini-slot unit, and a symbol unit, and this means that the PRS is repeatedly transmitted.

For example, it is assumed that an NR PRS in a slot is repeatedly transmitted in unit of a single symbol. In this case, the configuration information regarding the corresponding interval may derive an angle of reception or an Rx beam index from a symbol in which RSRP/SNR is maximal by means of the Rx beam sweeping.

Embodiment 1-2: Information Regarding the Rx Beam of the NR PRS should be Fed Back as Information Regarding Azimuth Aliened with Respect to a Specific Reference Point The information on the Rx beam refers to information about an optimal reception angle received entirely from the user equipment's point of view. However, since the gNB cannot know the reception angle reference point for the user equipment location transformation, a global reference point for the Rx beam of the user equipment may be necessary. In detail, the absolute location may specifically allow the gNB to determine a possibility of using UE capability.

When the user equipment feeds Rx beam information to the gNB, the user equipment may configure the following information.

For example, whether to align the reference for the azimuth of the Rx beam may determine to assign, to the gNB, an option to determine whether the corresponding information is available or unavailable and then use the corresponding information.

As another example, the time difference of the current beam may be included. When the feedback of specific values is difficult, the time difference may be fed back instead of a short order.

As further another example, Tx beams may be used for the alignment and transmission.

Embodiment 1-3: The Reception Signal Quality of the Tx/Rx Beam Received on the Basis of NR PRS is Also Transmitted, or Transmission Contents are Configured on the Basis of Priority When a Tx/Rx beam having the best reception signal quality is selected for each beam, for example, when a value such as RSRP is also configured to be fed back or a plurality of Tx/Rx beams are fed back, the number of fed-back beams for each Tx/Rx beam and quality information for each beam may also be included. Here, the quality information may replace information aligned with priority or may directly include the RSRP value. Also, the quality information may be replaced with interval information such as level/class depending on the measured Rx signal quality. The corresponding information may be utilized as weight information when actual positioning information is calculated. As described above, the NR PRS has not been determined at present, and the existing CSI-RS, SSB, and DMRS, and newly designed NR PRS may be candidates.

Embodiment 2: FDM-Based PRS Resource Allocation is Performed in Order Calculate Azimuth Through Phase Difference Estimation In the embodiment, as described above, an NR PRS resource allocation method not for RSRP (signal strength, signal quality)-based positioning but for azimuth estimation is proposed. Basically, narrow band-based channel estimation is necessary in order to estimate a phase difference for each beam. This is similar to a CSI-RS configuration for estimating a wideband channel quality indicator (CQI) and a narrow band CQI. Here, in order for the user equipment to estimate the phase difference, basically, it is necessary to assume that each beam is aligned based on a certain reference. The user equipment estimates a phase difference on the basis of the assumption and then estimates a change in a phase angle from the reference point. To this end, FDM-based PRS deployment is necessary.

Figure 16:
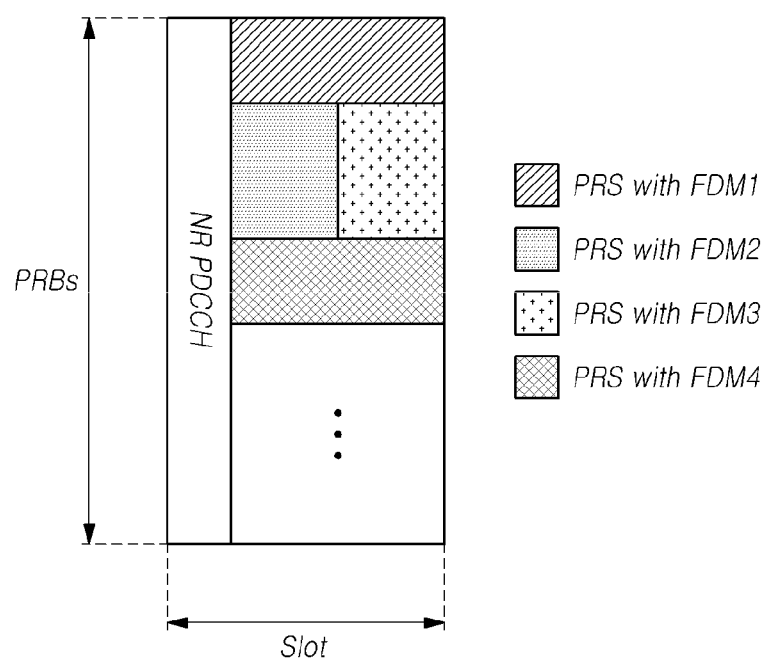
FIG. 16 is a diagram illustrating FDM-based PRS resource configuration according to an embodiment.

To this end, as shown in FIG. 16, PRS resource allocation including narrow-band "X" PRBs may be considered. Here, PRS signals including different Tx beams may be transmitted in FDM 1 band, FDM 2 band, FDM 3 band, and FDM 4 band. The same azimuth estimation as described above may be applied when the user equipment transmits an UL PRS signal.

As a result, the NR PRS configuration may refer to specific information in higher-layer signaling and may include information on the number of patterns of the NR PRS, the resource allocation information for each pattern, a transmission period, and a transmission interval such as a transmission slot index.

Thus, it is possible to provide a method and apparatus for repeatedly transmitting the positioning reference signal in order to perform positioning in a next-generation wireless network in accordance with embodiments of the present disclosure. In particular, the embodiments of the present disclosure may provide an azimuth-based positioning information feedback method for a 5G NR. In detail, an NR beam-based transmission method may be applied to the positioning by being applied at the transmission and reception sides.

The structural configurations of the user equipment and the base station that may implement some or all of the embodiments have been described with reference to FIGS. 1 to 16.

Figure 17:
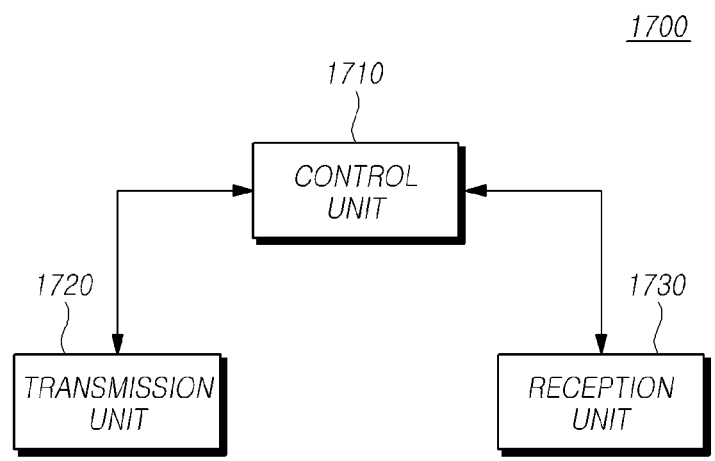
FIG. 17 is a diagram showing a user equipment according to an embodiment.

FIG. 17 is a diagram showing a user equipment 1700 according to an embodiment.

Referring to FIG. 17, the user equipment 1700 according to an embodiment includes a control unit 1710, a transmission unit 1720, and a reception unit 1730.

The control unit 1710 controls the overall operation of the user equipment 1700 for performing the above-described method for performing positioning according to the embodiments of the present disclosure. The transmission unit 1720 transmits uplink control information, data, and messages to a base station through corresponding channels. The reception unit 1730 receives downlink control information, data, messages or the like from a base station through corresponding channels The reception unit 1730 may receive configuration information regarding the repeated transmission of a positioning reference signal. The reception unit 1730 may receive configuration information regarding the positioning reference signal from a base station to perform Rx beamforming. In particular, a positioning reference signal transmitted from the base station may be repeatedly transmitted with respect to the same beam during a certain time interval in order for the user equipment to perform beam sweeping. Thus, the configuration information regarding the positioning reference signal may include the configuration information regarding the repeated transmission of the positioning reference signal.

For example, the configuration information regarding the repeated transmission may be received through higher layer signaling. However, this is merely one example, and the configuration information regarding the repeated transmission may be managed or delivered to a user equipment through an NR positioning protocol-based configuration signal.

The configuration information regarding the repeated transmission of the positioning reference signal may include information regarding an interval for repeating the same beam. That is, the configuration information regarding the repeated transmission may include information on a time interval unit for repeatedly transmitting the positioning reference signal. Also, the configuration information regarding the repeated transmission may include information about the number of repeated transmissions of the positioning reference signal in the time interval unit for repeatedly transmitting the positioning reference signal.

For example, the time interval unit for repeatedly transmitting the positioning reference signal may be set to be one of a slot unit, a mini-slot unit, and a symbol unit. For example, the repeatedly transmitted positioning reference signal may include N slot units (N is a natural number of one or more). In the case of a single symbol unit, a positioning reference signal in a slot may be repeatedly transmitted in units of a symbol.

The reception unit 1730 may repeatedly receive the positioning reference signal on the basis of the configuration information regarding the repeated transmission. The reception unit 1730 may receive the positioning reference signal using radio resources allocated for the transmission of the positioning reference signal on the basis of the configuration information regarding the positioning reference signal. The reception unit 1730 may receive the positioning reference signal on the basis of the configuration information regarding the subcarrier spacing of the frequency band in which the positioning reference signal is transmitted, the transmission pattern information of the positioning reference signal, and the configuration information regarding the repeated transmission of the positioning reference signal included in the configuration information regarding the positioning reference signal.

In particular, the reception unit 1730 may repeatedly receive the positioning reference signal on the basis of the number of repeated transmissions of the positioning reference signal in a time interval for repeatedly transmitting the positioning reference signal. On the basis of configuration information regarding the time interval for repeatedly transmitting the positioning reference signal, the transmission unit 1720 may perform Rx beam sweeping on the interval for repeatedly transmitting the positioning reference signal. The control unit 1710 may derive an angle of reception or an Rx beam index from a time interval in which RSRP/SNR is maximal by means of the Rx beam sweeping.

The transmission unit 1720 may transmit Rx beam index information regarding the positioning reference signal to the base station. The base station may measure the location of the user equipment on the basis of the corresponding Rx beam index information.

Thus, it is possible to provide a method and apparatus for repeatedly transmitting the positioning reference signal in order to perform positioning in a next-generation wireless network according to the embodiments of the present disclosure. In particular, by performing the Rx beam sweeping on a positioning reference signal that is repeatedly transmitted using the same beam during a certain time interval according to the embodiments of the present disclosure, it is possible to perform more accurate and efficient positioning.

Figure 18:
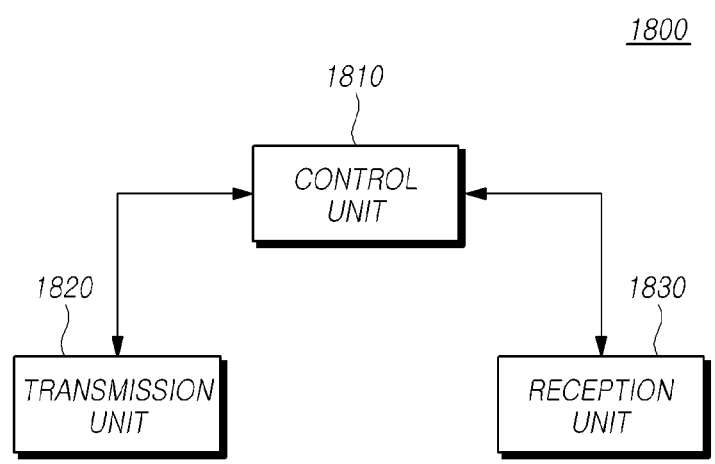
FIG. 18 is a diagram showing a base station according to an embodiment.

FIG. 18 is a diagram showing a base station 1800 according to an embodiment.

Referring to FIG. 18, the base station 1800 according to an embodiment includes a control unit 1810, a transmission unit 1820, and a reception unit 1830.

The control unit 1810 controls the overall operation of the base station 1800 for performing the above-described method enabling a user equipment to perform positioning in accordance with the embodiments of the present invention. The transmission unit 1820 and the reception unit 1830 are used to transmit or receive a signal, a message, or data needed to implement the above-described present invention to or from the user equipment.

The transmission unit 1820 may transmit the configuration information regarding the repeated transmission of the positioning reference signal. The transmission unit 1820 may transmit, to the user equipment, configuration information that is related to the positioning reference signal and that is necessary for the transmission of the positioning reference signal. The transmission unit 1820 may repeatedly transmit the positioning reference signal using the same beam during a predetermined time interval. Thus, the configuration information regarding the positioning reference signal may include the configuration information regarding the repeated transmission of the positioning reference signal.

For example, the configuration information regarding the repeated transmission may be transmitted through higher layer signaling. However, this is merely one example, and the configuration information regarding the repeated transmission may be managed or transmitted to a user equipment through an NR positioning protocol-based configuration signal.

The configuration information regarding the repeated transmission of the positioning reference signal may include information on an interval for repeating the same beam. That is, the configuration information regarding the repeated transmission may include information about a time interval unit for repeatedly transmitting the positioning reference signal. Also, the configuration information regarding the repeated transmission may include information on the number of repeated transmissions of the positioning reference signal in the time interval unit for repeatedly transmitting the positioning reference signal.

For example, the time interval unit for repeatedly transmitting the positioning reference signal may be set to be one of a slot unit, a mini-slot unit, and a symbol unit. For example, the repeatedly transmitted positioning reference signal may include N slot units (N is a natural number of one or more). In the case of a single symbol unit, a positioning reference signal in a slot may be repeatedly transmitted in units of a symbol.

The transmission unit 1820 may repeatedly transmit the positioning reference signal on the basis of the configuration information regarding the repeated transmission. The transmission unit 1820 may transmit the positioning reference signal using radio resources allocated for the transmission of the positioning reference signal on the basis of the configuration information regarding the positioning reference signal. The transmission unit 1820 may transmit the positioning reference signal on the basis of the configuration information regarding the subcarrier spacing of the frequency band in which the positioning reference signal is transmitted, the transmission pattern information of the positioning reference signal, and the configuration information regarding the repeated transmission of the positioning reference signal included in the configuration information regarding the positioning reference signal.

In particular, the transmission unit 1820 may repeatedly transmit the positioning reference signal on the basis of the number of repeated transmissions of the positioning reference signal in a time interval for repeatedly transmitting the positioning reference signal. When the configuration information regarding the time interval for repeatedly transmitting the positioning reference signal is received, the user equipment may perform Rx beam sweeping on the interval for repeatedly transmitting the positioning reference signal. The user equipment may derive a reception angle or an Rx beam index from a time interval in which RSRP/SNR is maximal by means of the Rx beam sweeping.

The reception unit 1830 may receive Rx beam index information regarding the positioning reference signal from the base station. The control unit 1810 may measure the location of the user equipment on the basis of the corresponding Rx beam index information.

Thus, it is possible to provide a method and apparatus for repeatedly transmitting the positioning reference signal in order to perform positioning in a next-generation wireless network in accordance with the embodiments of the present disclosure.

According to the embodiments, it is possible to provide a method and apparatus for repeatedly transmitting a positioning reference signal in order to perform positioning in a next-generation wireless network.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment performing positioning, the method comprising:
    receiving configuration information regarding repeated transmission of a positioning reference signal (PRS); and
    repeatedly receiving the PRS based on the configuration information regarding the repeated transmission,
    wherein the PRS is received through one of a plurality of PRS resources included in a PRS resource set, and
    wherein the configuration information includes information regarding a number of repetitions of a given PRS resource having a same PRS resource ID in a single instance of the PRS resource set and an offset in units of a slot between two repetitive instances of the given PRS resource having the same PRS resource ID, and
    wherein the number of repetitions is set to one of 1, 2, 4, 6, 8, 16, and 32.

2. The method of claim 1, wherein the configuration information regarding the repeated transmission is received through higher layer signaling.

3. The method of claim 1, wherein the repeated receiving of the PRS includes performing an Rx beam sweeping operation on the repeatedly transmitted PRS.

4. The method of claim 1, wherein the PRS is associated with a same beam within a time interval unit for transmitting the PRS repeatedly.

5. A method of a base station for performing positioning, the method comprising:
    transmitting configuration information regarding repeated transmission of a positioning reference signal (PRS); and
    repeatedly transmitting the PRS based on the configuration information regarding the repeated transmission,
    wherein the PRS is received through one of a plurality of PRS resources included in a PRS resource set, and
    wherein the configuration information includes information regarding a number of repetitions of a given PRS resource having a same PRS resource ID in a single instance of the PRS resource set and an offset in units of a slot between two repetitive instances of the given PRS resource having the same PRS resource ID, and
    wherein the number of repetitions is set to one of 1, 2, 4, 6, 8, 16, and 32.

6. The method of claim 5, wherein the configuration information regarding the repeated transmission is transmitted through higher layer signaling.

7. The method of claim 5, wherein the PRS is associated with a same beam within a time interval unit for transmitting the PRS repeatedly.

8. A user equipment for performing positioning, the user equipment comprising:
    a processor configured to control constituent elements of the user equipment for performing operations for performing positioning;
    a transmitter configured to transmit uplink control information, data, and message to a base station through associated channels in response to the processor; and
    a receiver configured to receive, from the base station, control information, data, and messages in response to the processor,
    wherein the receiver receives configuration information regarding repeated transmission of a positioning reference signal (PRS) and repeatedly receives the PRS based on the configuration information regarding the repeated transmission,
    wherein the PRS is received through one of a plurality of PRS resources included in a PRS resource set, and
    wherein the configuration information includes information regarding a number of repetitions of a given PRS resource having a same PRS resource ID in a single instance of the PRS resource set and an offset in units of a slot between two repetitive instances of the given PRS resource having the same PRS resource ID, and
    wherein the number of repetitions is set to one of 1, 2, 4, 6, 8, 16, and 32.

9. The user equipment of claim 8, wherein the configuration information regarding the repeated transmission is received through higher layer signaling.

10. The user equipment of claim 8, where the receiver performs an Rx beam sweeping operation on the repeatedly transmitted PRS.

11. The user equipment of claim 8, wherein the PRS is associated with a same beam within a time interval unit for transmitting the PRS repeatedly.

\* \* \* \* \*